United States Patent [19]

Cummings et al.

[11] 4,055,151
[45] Oct. 25, 1977

[54] WASTE HEAT BOILER

[75] Inventors: Robert James Cummings, Morpeth, England

[73] Assignee: Clarke Chapman, Ltd., England

[21] Appl. No.: 717,834

[22] Filed: Aug. 25, 1976

Related U.S. Application Data

[62] Division of Ser. No. 496,673, Aug. 12, 1974, abandoned.

[30] Foreign Application Priority Data

Aug. 21, 1973 United Kingdom .............. 39405/73
Sept. 8, 1973 United Kingdom .............. 42326/73

[51] Int. Cl.² ............................................. F22B 1/18
[52] U.S. Cl. ............................ 122/7 B; 137/625.21;
137/625.47
[58] Field of Search ..................... 122/7 R, 7 B, 4 R;
137/625.21, 625.41, 625.43, 625.46, 625.47

[56] References Cited

U.S. PATENT DOCUMENTS

| | | | |
|---|---|---|---|
| 2,612,829 | 10/1952 | Joyce | 137/625.41 |
| 2,695,036 | 11/1954 | Kronheim | 137/625.46 |
| 3,136,339 | 6/1964 | Champion | 137/625.41 |
| 3,471,021 | 10/1969 | Prizler | 137/625.21 |
| 3,477,411 | 11/1969 | Gething | 122/7 |

FOREIGN PATENT DOCUMENTS

| | | | |
|---|---|---|---|
| B22,624 | 9/1955 | Germany | 122/7 |
| 1,173,717 | 12/1969 | United Kingdom | 122/7 |

*Primary Examiner*—Kenneth W. Sprague

[57] ABSTRACT

The invention is a valve especially a divertor valve for diverting hot gas to a boiler or to a duct by-passing the boiler and for controlling the amount of gas flowing through the boiler. The valve enables changeover from one flow path to another by rotary movement. The valve member is of plate construction having scraping action on the wall of the valve chamber and allowing 45° angle of flow between inlet and outlet ports.

10 Claims, 6 Drawing Figures

WASTE HEAT BOILER

This is a division, of application Ser. No. 496,673, filed Aug. 12, 1974, now abandoned.

BACKGROUND OF THE INVENTION

The invention relates to valves, especially though not exclusively gas divertor valves applicable to waste heat recovery or other boilers for the purpose of diverting the hot gas stream either through or over the boiler tubes or through a gas by-pass.

Such valves are known but suffer from the drawback of involving relatively complicated construction, especially involving the use of cylindrical sleeve-shaped valve members having a multiplicity of apertures, which present considerable resistance to the flow of hot gas through the valve. Also, known valves do not provide optimum flow paths for the gas stream but cause sudden and severe changes in the direction of gas flow and eddying, which further reduces the efficiency of the valve. The valve is particularly applicable to waste heat recovery from heat engines such as diesel engines, where resistance to gas flow through the valve must be minimised in order to minimise loss of power from the heat engine.

Known valves tend to be such as to accumulate deposits where the gas stream, such as the exhaust gas stream from a diesel engine, contains carbon and other solid particles.

The present invention provides a valve which reduces or eliminates the drawbacks associated with known valves of that kind.

BRIEF DESCRIPTION OF THE INVENTION

A valve in accordance with the invention comprises wall means defining a valve chamber, a valve member, and means mounting said valve member for rotation within said valve chamber about an axis extending centrally of said valve chamber, said valve member having peripheral surface means in sealing relationship with said wall means, including opposite end portions in sealing relationship with respective portions of said wall means which are separated both peripherally and longitudinally of said valve chamber.

Preferably, said wall means comprise a cylindrical wall.

Said axis may extend longitudinally of said valve chamber or may extend diametrally of said valve chamber.

Said valve member is preferably an elliptical plate which is rotatable about said axis between positions in which said plate is inclined, respectively, in different senses to said wall means, but said valve member may comprise an assembly comprising an intermediate sub-member and two further sub-members extending from opposite ends, respectively of said intermediate sub-member in opposite directions laterally of said intermediate sub-member, which further sub-members have said end portions of said peripheral surface means, in which case said rotational axis extends preferably longitudinally of said valve chamber.

Said intermediate sub-member may extend parallel to said axis or be inclined thereto and said further sub-members may be inclined to said axis or extend at right angles thereto.

The preferred angle of inclination of said plate, or of said inclined intermediate sub-member, or of said inclined further sub-members in said positions of said valve member is 45°.

BRIEF DESCRIPTION OF THE DRAWINGS

In the drawings:-

FIG. 6 is a diagrammatic longitudinal section through yet another embodiment of valve and through part of a boiler of which the valve forms part;

DESCRIPTION OF PREFERRED EMBODIMENTS

Figure 1:
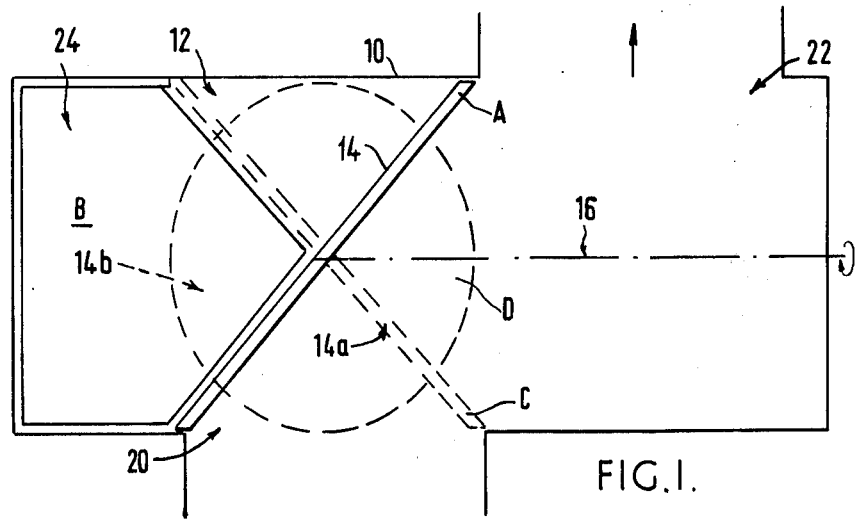
FIG. 1 is a diagrammatic longitudinal section through one embodiment of valve.

FIG. 1 shows a valve which has a valve housing 10 in which there is a cylindrical valve chamber 12 containing an elliptical valve member 14 which is mounted at an angle of 45° to the central longitudinal axis 16 of the chamber 12. The valve member 14 is an elliptical plate the periphery of which fits in sealing relationship as closely as possible to the cylindrical wall of the chamber 12, allowing for thermal expansions so as to permit rotation of the valve member. The valve member 14 is mounted on a shaft (FIG. 3 not shown in FIG. 1), which passes through a central aperture in the plate and has its longitudinal central axis coincident with the axis 16. The valve member 14 is braced by two radially-extending tie bars (not shown) each of which extends along the central axis of the chamber 12, and which is rotatable to change the position of the valve member 14.

The valve housing 10 has an inlet port 20 and a first outlet port 22. The housing 10 has a second outlet port 24.

The valve member 14 is shown by full lines in a first position in which a fluid entering the inlet port 20 is diverted to the first outlet 22. The valve member 14 can be rotated through 180° into a second position 14a indicated by broken lines in which a fluid entering the inlet 20 is diverted to the outlet 24.

The valve member 14 can be set in any position intermediate those two positions (the mid-position 14b is shown in broken lines) so that some fluid can pass to the outlet 22 and some to the outlet 24.

The angle of the inclination of the valve member 14 at 45° is particularly advantageous from the point of view of efficient flow of the fluid between the inlet 20 and either outlet 22 or 24 though a different angle of inclination may also be used.

The change of position of the edge of the valve member 14 when it is rotated is worthy of special note since the edge has a sweeping or scraping action relative to the wall of the chamber 12 which gives a self-cleaning characteristic to the valve. This is very advantageous where the fluid to be diverted contains material such as carbon particles which in time produces deposits in the valve chamber tending to reduce the efficiency of the valve. The construction described eliminates or reduces such deposits and therefore is especially useful as a divertor valve for use in diesel exhaust waste heat recovery boilers; for example in ships.

The periphery of the valve member 14 can itself make a sufficiently good seal in relation to the wall of the chamber 12. However, if desired a resilient seal strip can be attached to the periphery of the valve member 14 and arranged to engage the wall of the chamber 14.

While a simple plate is shown in FIG. 1 as the valve member 14, in alternative constructions the valve member may in fact be an assembly of parts. Clearly, where the valve member 14 has a resilient seal the member as a whole is an assembly and in other forms of construction there may be an assembly of parts whether a seal is included or not.

Figure 2:
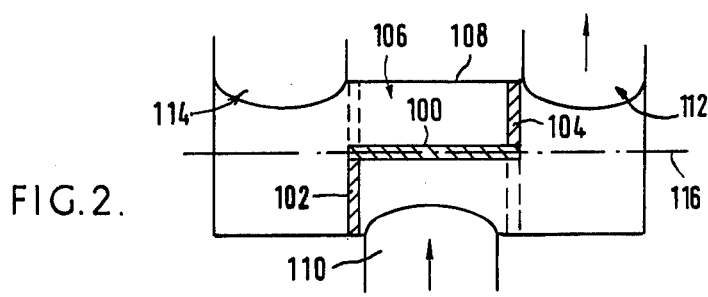
FIG. 2 is a diagrammatic longitudinal section through another embodiment of valve.

It is not necessary for the valve member to be an elliptical plate. FIG. 2 shows an alternative construction in which the valve member is constituted by a rectangular plate 100 having at opposite ends oppositely directed semi-circular flanges 102, 104. The valve member is mounted in a cylindrical valve chamber 106 in a valve housing 108 having an inlet port 110 and two outlet ports 112, 114.

The valve member is rotatable about the axis 116 from a position shown, in which the inlet 110 communicates with the outlet 112, to a position shown by broken lines in which the inlet 110 communications with the outlet 114.

Intermediate positions can be set, in which the inlet 110 communicates with both outlets 112, 114 equally or to differing degrees.

In both FIG. 1 and FIG. 2, the valve member divides the valve chamber into two parts. The shape of the valve member and its orientation permits the change-over between one flow-path to another by mere rotation of the valve member as shown by the arrow in FIG. 1.

In a further alternative, not shown, the valve member may be of construction intermediate that shown in FIG. 1 and in FIG. 2. The plate 100 could be slightly inclined relative to the axis 116 and the two flanges 102, 104 may be either at right angles to the axis 116 or also inclined to the axis 116 and to the plate 100. The plate 100 would then be of partly elliptical shape and if the flanges 102, 104 are also inclined to the axis 116 then they too would be of partly elliptical shape.

In all of the valve members described in this specification, opposite ends of the valve member are in sealing relationship with the valve chamber at points which are separated both angularly about the axis of rotation and lengthwise of the valve chamber so that the boundaries of the two parts of the valve chamber (into which the chamber is divided by the valve member) are readily changed by rotation of the valve member about the axis of rotation.

Figure 3:
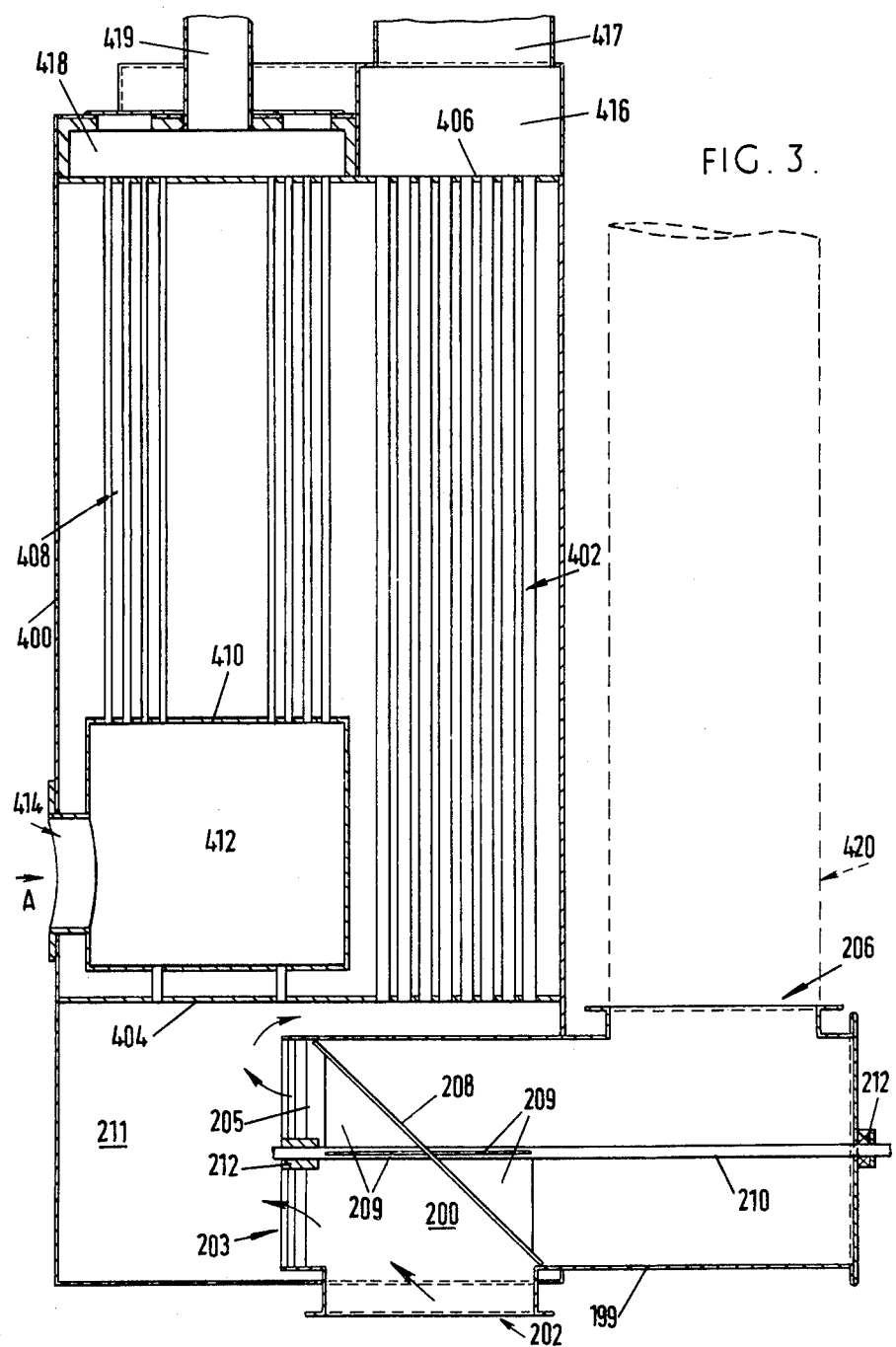
FIG. 3 is a diagrammatic vertical section through a boiler having a valve according to the invention.
Figure 4:
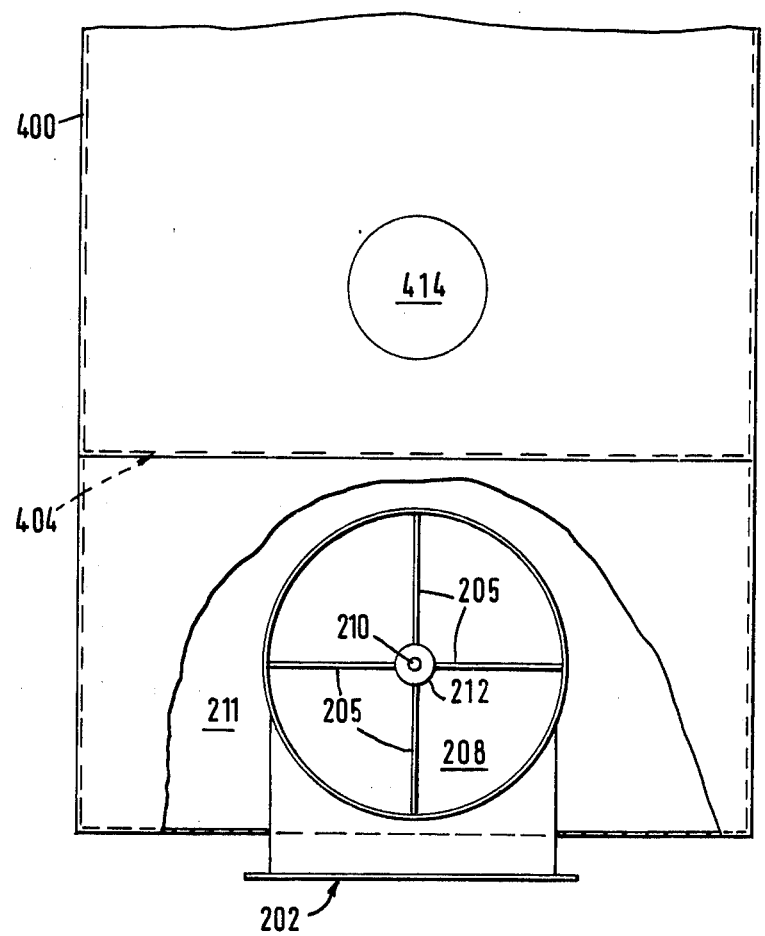
FIG. 4 is a part elevation looking in the direction of the arrow 'A' in FIG. 3.

FIGS. 3 and 4 show a boiler having a valve similar to one of the embodiments described above.

The valve housing 199 is open at one end to provide an outlet port 203.

At that end a bearing 212 is supported by four radial arms 205. Three radially-extending triangular bracing plates 209 are provided at each side of the valve member 208.

The valve housing 199 is mounted beneath an upright sheet boiler which is typically a composite boiler for marine use and which includes a cylindrical shell 400 and main firetubes 402 extending between lower and upper horizontal tubeplates 404, 406. The shell 400 also contains subsidiary firetubes extending between a subsidiary tubeplate 410 and the tubeplates 406. The tubeplate 410 forms part of a hot gas chamber 412 which receives the hot gases from an oil-fired burner (not shown) mounted in line with an aperture 414 in the chamber 412.

The main firetubes 402 open into an outlet box 416 having an outlet 417 leading to the ship's funnel and the subsidiary firetubes 408 open into a separate outlet box 418 having a separate outlet 419 leading to the funnel.

The valve housing inlet 202 is connected to a duct (not shown) conducting exhaust gas from the ship's diesel engine. The outlet 206 is connected to a by-pass duct, indicated by broken lines at 420, which also leads to the ship's funnel.

The outlet 203 opens into a gas inlet casing 211 beneath the tubeplate 404.

The main firetubes of the boiler can be heated by the exhaust gas from the diesel engine or the subsidiary tubes can be heated by the oil fired burner. In either case water in the shell 400 is heated and turned into steam.

The valve member 208 can be adjusted by rotation of the shaft 210 to cause all hot gas to pass from the outlet 202 to the main firetubes 402 as shown in FIG. 3, the by-pass duct 420 being isolated from the inlet 202; or to positions in which some gas passes through the tubes 402 and some through the by-pass duct 420; or to a position 180° different from that shown in FIG. 3 in which all the gas is diverted to the by-pass duct and none enters the tubes 402.

The valve fits very compactly into the boiler. Typical dimensions indicating the proportions of the boiler are: distance between tubeplates 404, 406: 11 feet, 6 inches; height of inlet casing 211: 4 feet; outside diameter of shell 400: 7 feet 3 inches; outside diameter of valve housing 199: 3 feet 3 inches.

Figure 5:
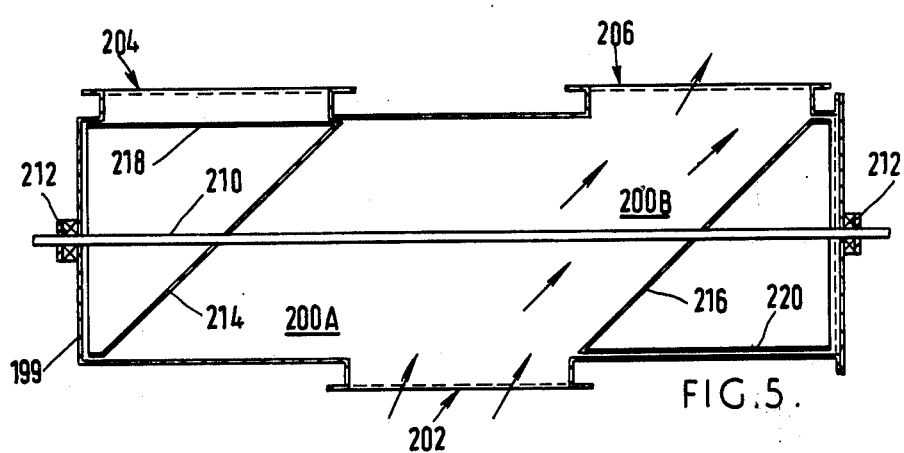
FIG. 5 is a diagrammatic longitudinal section through yet another embodiment of valve according to the invention.

FIG. 5 shows a further embodiment of valve (the same reference numerals are used for the parts corresponding to the FIG. 3 embodiment) in which a housing 199 having an inlet port 202 and outlet ports 204, 206 contains a shaft 210 mounted in bearing 212. Two valve members are mounted on the shaft, each rotatable within its own valve chamber 200A, 200B. Each valve member is an elliptical plate 214, 216. The valve member 214 is secured to a port-cylindrical shroud 218 and the valve member 216 is secured to a similar shroud 220. The shrouds 218, 220 are not essential and can be omitted if desired. The operation of the valve is similar to that of the other embodiments. The gas pressure acts on the two valve members 214, 216 so that the resultant forces are balanced in directions parallel to and transversely of the assembly. A small unbalanced moment remains but the elimination of unbalanced linear forces reduces vibration when the valve is used in a pulsating gas current, for example in the exhaust gas current from a diesel engine.

Figure 6:
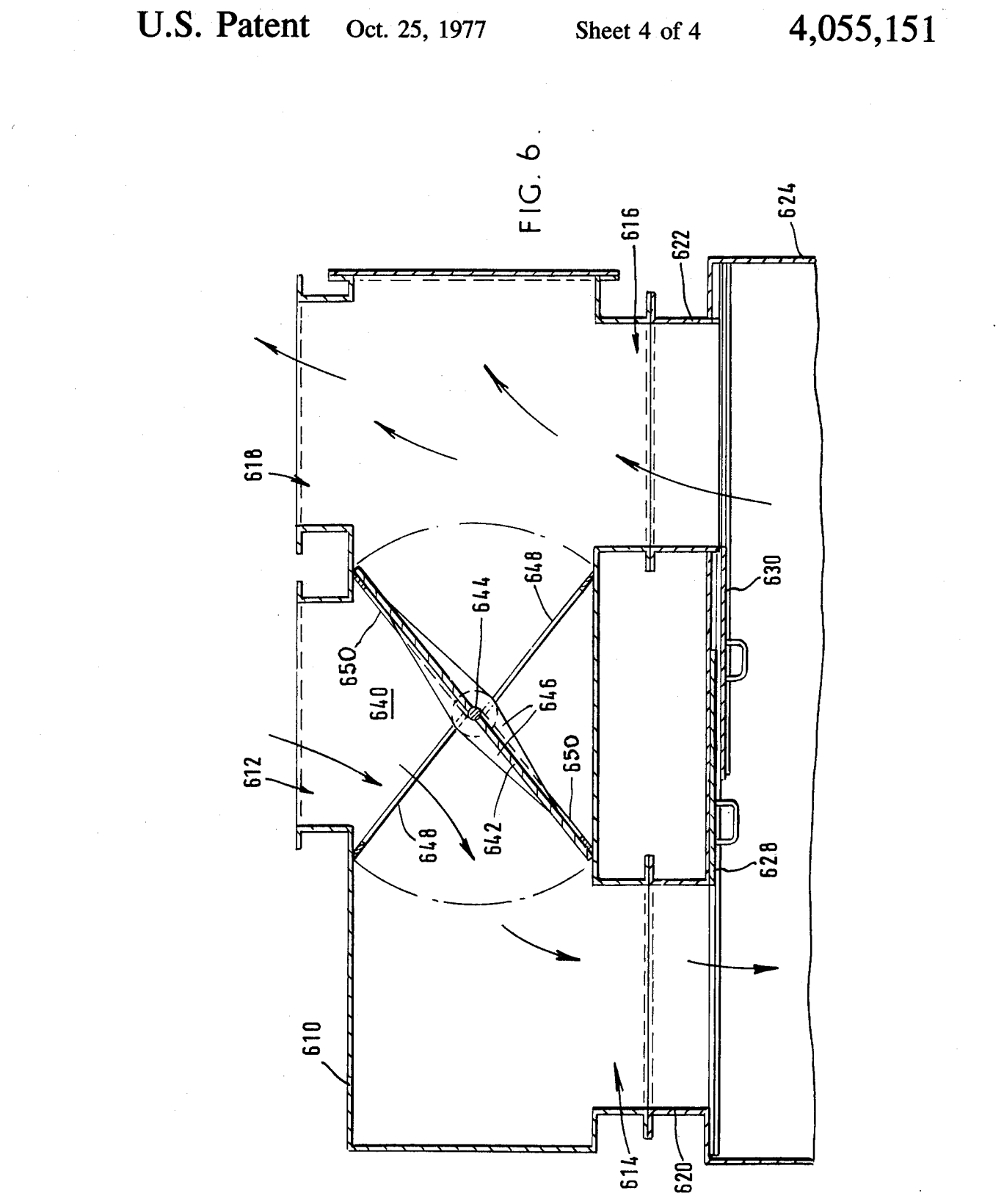

FIG. 6 shows a cylindrical valve housing 610 having four ports namely, a hot gas inlet 612; a hot gas outlet 614, a cool gas inlet 616; and a cool gas outlet 618. The outlets and inlets are defined by flanged nozzles of the housing 610 so that the inlet 612 and outlet 618 can be connected to passageways (not shown) defined by ducts having flanged ends secured to the flanges of the nozzles defining the inlet 612 and outlet 618. Similarly, the flanges of the nozzles defining the outlet 614 and inlet 616 are secured to flanges of short ducts 620, 622, respectively, which, respectively, open from and into a casing 624. One part of the interior of the casing 624 communicates with the inlets of a heat exchange zone formed by an array of boiler tubes within a shell (not shown) and another part of the casing 624 communicates with the outlets of those tubes. The shell contains water surrounding the tubes so that when hot gas passes through the tubes the water in the shell is heated. The boiler is typically a steam boiler but may alternatively be used merely for producing hot water, or for heating some other liquid.

Adjustable means in the form of isolating dampers 628, 630 are provided slidably mounted in slides attached to the upper wall of the casing 624.

The housing 610 defines a cylindrical valve chamber 640 which contains an elliptical valve member in the form of a plate 642 which is mounted on a horizontal diametral shaft 644. The shaft 644 extends through the wall of the housing 610 and is rotatable by an external worm wheel and worm gear mechanism operable by a handwheel (not shown). The valve member 642 is braced by flanges 646 on either side and is engageable alternatively with a first pair of semi-ellipse shaped arcuate valve seats 648 or a second pair of similar seats 650 mounted on the wall of the housing 610. One valve seat 648 is on one side of the valve member 642 and the other seat 648 is on the other side of the member 642. Similarly, the seats 650 are on opposite sides of the member 642. Marginal plane surface portions of the member 642 thus engage the seats 648, 650.

FIG. 6 shows the valve member 642 engaging the seats 650 in a position to allow hot gas (say exhaust from a diesel engine) to flow as indicated by the arrows into the inlet 612 and out of the outlet 614 to enter the casing 624. Cool gas, having given up heat in the boiler tubes, leaves the casing 624, enters the housing 610 through the inlet 616 and leaves the valve through the outlet 618, whence it passes to an exhaust duct and stack.

In the opposite extreme position of the valve member 642 (not shown) the valve member engages the seats 648 to allow the hot gas to pass directly from the inlet 612 to the outlet 618, thus by-passing the heat exchange zone of the boiler formed by the array of boiler tubes.

The valve thus can be moved to divert the hot gas flow from one path to another.

Intermediate positions (not shown) of the valve member 642 are available to apportion flow of hot gas so that some passes through the boiler tubes and some by-passes the tubes. This gives control of the heat input to the water or other liquid in the shell.

The dampers 628, 630 can be moved outwardly to positions (not shown) in which they close the nozzles 620 and 622 so that when required repairs or maintenance can be carried out to the boiler tubes or other parts within the casing 624 or remainder of the boiler while the hot gas continues to pass to the outlet 618.

In some applications it may be possible to eliminate the valve seats 648, 650 and rely only on close sliding engagement between peripheral edge surfaces of the plate member 642 and the wall of the valve chamber 640. Alternatively, a deformable or other kind of seal member may be attached to the member 642 to provide a peripheral surface or surfaces slidingly engaging the wall of the valve chamber 640.

Whatever mode of sealing is used, the valve member 642, when moved, has a scouring action on any deposits adhering to the wall of the valve chamber 640 and build-up of heavy deposits which reduce gas flow efficiency is prevented.

In another modification, (not shown) the valve housing may have only three ports namely, one inlet and only two outlets, for example, the valve member being movable between a position in which gas passes from the inlet to a first outlet and thence to boiler tubes, and another position in which gas passes to the other outlet and thence to a by-pass duct.

The valve as such can replace the valves described and shown in FIGS. 3 and 4 above. Furthermore, the valve housing may have an inlet or outlet which is co-axial with the valve chamber 640 rather than transverse to the valve chamber 640. The function of the valve can be reversed, i.e. outlets can function as inlets and inlets as outlets, and that is also true of all of the embodiments of valve described above.

In another modification it is possible to allow some hot gas flow to a by-pass in all positions of the valve member, that is, the valve member may effect a complete closing-off only in respect of the boiler heat exchange zone.

The invention is applicable generally to boilers having by-pass ducts and is not restricted to shell boilers nor to marine use.

The invention is applicable to composite boilers, that is boilers having a fuel burner to generate heat when the waste gas stream is not available and is also applicable to auxiliary or other boilers in which heat is derived only from a burner.

The valve of the invention is applicable to general use for fluids, embracing gases or liquids, whether in boilers or elsewhere and for pulverulent or particulate material or smoke, whether cutting or apportioning or diverting or any combination of such functions is required.

Flow through the valve may be the reverse of that described, the flow entering at either of two inlets being diverted to a single outlet. That application lends itself to the mixing of fluids or particulate or other material.

What we claim is:

1. A boiler comprising a housing, a boiler heat exchange zone within the housing, a duct bypassing said heat exchange zone, a valve within said housing and comprising wall means defining a valve chamber, a valve member and means mounting said valve member for rotation in said valve chamber about an axis extending centrally of said valve chamber between first and second positions, said valve member having peripheral surface means in sealing relationship with said wall means including opposite end portions in sealing relationship with respective portions of said wall means which are separated both peripherally and longitudinally of said valve chamber, said wall means defining a first outlet port leading to said heat exchange zone and a second outlet port leading to said duct bypassing said heat exchange zone and an inlet port which is put in communication only with said first outlet port by rotation of said valve member about said axis to said first position, said inlet port being put in communication only with said second port by rotation of said valve member about said axis to said second position, and said inlet port being put in communication with both said outlet ports by rotation of said valve member about said axis to any intermediate position between said first and second positions, said valve member in any of said intermediate positions cooperating with said wall means to define two passage means respectively contiguous with said boiler and said duct, the ratio of the proportions of said passage means being variable in response to said rotation of said valve member between said first and second positions.

2. A boiler according to claim 1, in which said wall means comprise a cylindrical wall and said peripheral surface means are elliptically shaped.

3. A boiler according to claim 1, in which said wall means comprise a cylindrical wall and said valve member comprises an elliptical plate rotatable about said axis between positions in which said plate is inclined, respectively, in different senses to said wall means.

4. A boiler according to claim 3, in which said axis extends longitudinally of said valve chamber.

5. A boiler according to claim 1, in which said axis extends longitudinally of said valve chamber and in which said valve member comprises an intermediate sub-member and two further sub-members extending from opposite ends, respectively, of said intermediate sub-member in opposite directions laterally of said intermediate sub-member, which further sub-members have said end portions of said peripheral surface means.

6. A boiler according to claim 1 wherein said wall means define two valve chambers, two valve members, means mounting said valve members for rotation each in a respective one of said valve chambers each about an axis extending centrally and longitudinally of the respective valve chamber, each of said valve members having peripheral surface means in sealing relationship with said wall means including opposite end portions in sealing relationship with respective portions of said wall means which are separate both peripherally and longitudinally of the respective valve chamber.

7. A boiler according to claim 6, in which said valve members are spaced apart and in which said wall means defines port means communication between which can be established by positioning of said valve members each about said axis so as to bring a flow path zone between said valve members into communication only with a certain group of said port means, and in which communication between port means can be changed by rotation of said valve means each about said axis to bring said zone into communication only with another group of said port means.

8. A boiler according to claim 1 wherein the heat exchange zone comprises main fire tubes and subsidiary fire tubes, a hot gas chamber within the housing and coupled to the subsidiary fire tubes, said first outlet being coupled to the main fire tubes, said inlet receiving hot exhaust gas, said valve providing selective heating of the main fire tubes, said hot gas chamber providing selective heating of the subsidiary fire tubes.

9. A boiler according to claim 8 wherein said hot gas chamber is located below the subsidiary fire tubes, and said valve is located below the main fire tubes.

10. A boiler according to claim 3 wherein the inlet port is located in the cylindrical wall adjacent the valve member, and the first and second outlet ports are located on opposite sides of the inlet port.

* * * * *